(12) United States Patent
Durham et al.

(10) Patent No.: US 10,029,851 B1
(45) Date of Patent: Jul. 24, 2018

(54) ROUTING BASED ON AUTOMATION CAPABILITIES IN INVENTORY SYSTEM

(71) Applicant: Amazon Technologies, Inc., Seattle, WA (US)

(72) Inventors: Joseph W. Durham, Somerville, MA (US); Scott Dresser, Boxborough, MA (US); John Gregory Longtine, Sudbury, MA (US); Diane Grieselhuber Mills, Wilmington, MA (US); Parris S. Wellman, Reading, MA (US); Steven Augustine Wilson, Sudbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 111 days.

(21) Appl. No.: 15/268,377

(22) Filed: Sep. 16, 2016

(51) Int. Cl.
   *B65G 1/137* (2006.01)
   *B65G 1/04* (2006.01)
   *B65G 1/10* (2006.01)

(52) U.S. Cl.
   CPC ......... *B65G 1/1373* (2013.01); *B65G 1/0492* (2013.01); *B65G 1/10* (2013.01); *Y10S 901/01* (2013.01); *Y10S 901/30* (2013.01)

(58) Field of Classification Search
   USPC ....................................................... 700/214
   See application file for complete search history.

(56) References Cited

U.S. PATENT DOCUMENTS

| | | | |
|---|---|---|---|
| 7,603,299 B1 * | 10/2009 | Dewey, Jr. ......... | G06Q 10/0631 700/32 |
| 8,280,547 B2 | 10/2012 | D'Andrea et al. | |
| 8,442,879 B2 * | 5/2013 | Dewey, Jr. ......... | G06Q 10/0631 705/28 |
| 8,718,814 B1 | 5/2014 | Clark et al. | |
| 9,087,314 B2 | 7/2015 | Hoffman et al. | |
| 9,346,619 B1 | 5/2016 | O'brien et al. | |
| 9,378,482 B1 | 6/2016 | Pikler et al. | |
| 9,389,609 B1 | 7/2016 | Mountz et al. | |
| 9,650,208 B2 * | 5/2017 | Olson .................. | B65G 1/1373 |
| 2016/0145045 A1 | 5/2016 | Mountz et al. | |

OTHER PUBLICATIONS

U.S. Appl. No. 15/268,414, filed Sep. 16, 2016, Titled: Amassing Pick and/or Storage Task Density for Inter-Floor Transfer.

* cited by examiner

*Primary Examiner* — Kyle O Logan
(74) *Attorney, Agent, or Firm* — Kilpatrick Townsend & Stockton LLP

(57) ABSTRACT

Item information such as an identity or arrangement of a selected inventory item of an inventory system can be determined. A classification of the selected inventory item can be obtained based at least in part on the item information. The selected inventory item can be routed based at least in part on the classification of the selected inventory item. For example, the selected inventory item may be routed for manual handling if the classification of the selected inventory item indicates that the selected inventory item is designated for an operation to be performed relative to the selected inventory item by a human operator. Alternatively, the selected inventory item may be routed for automated handling if the classification of the selected inventory item indicates that the selected inventory item is designated for an operation to be performed relative to the selected inventory item by a robotic manipulator.

20 Claims, 9 Drawing Sheets

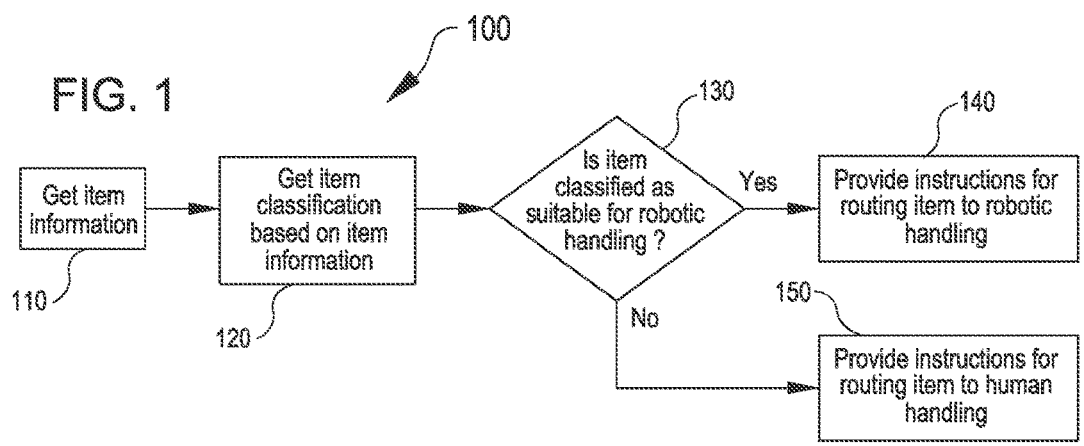
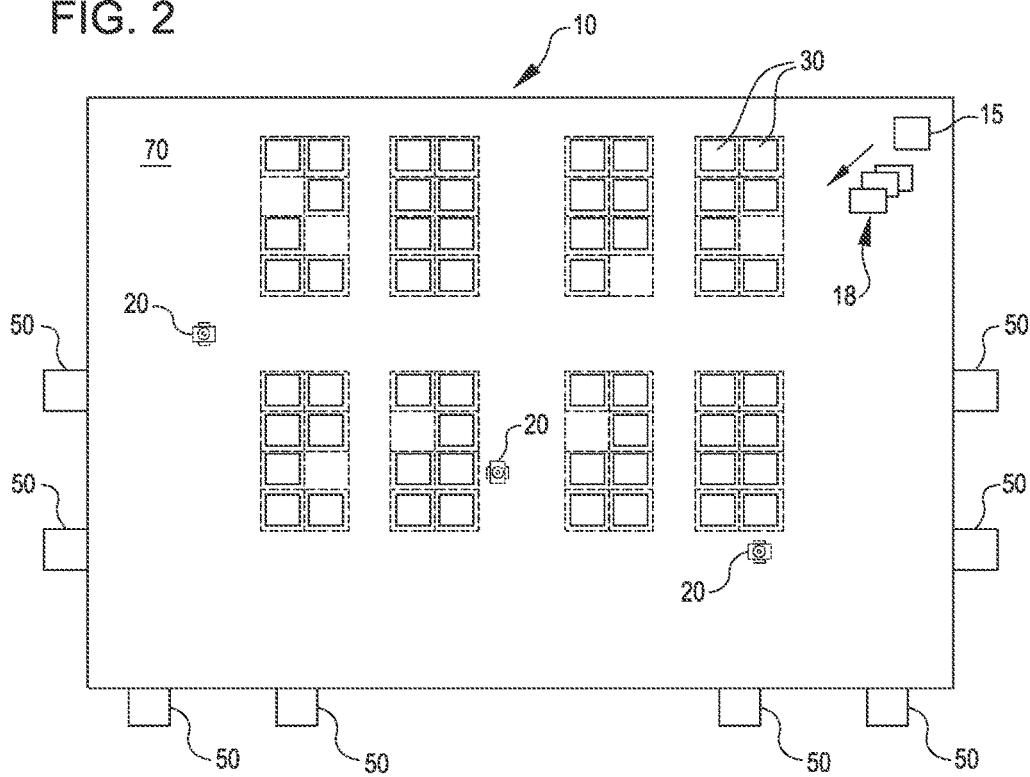

ROUTING BASED ON AUTOMATION CAPABILITIES IN INVENTORY SYSTEM

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which:

FIG. 1 is a flow chart illustrating a process that can be performed in an inventory system according certain embodiments;

FIG. 2 illustrates components of an inventory system according to certain embodiments;

DETAILED DESCRIPTION

Figure 3:
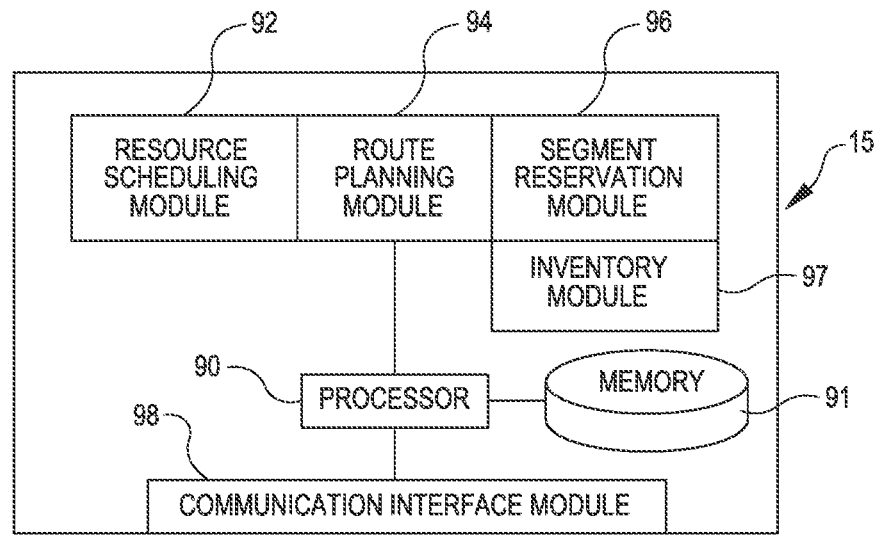
FIG. 3 illustrates in greater detail the components of an example management module that may be utilized in certain embodiments of the inventory system shown in FIG. 2.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Specifically, features herein are directed to operations of inventory systems that use containers and/or other features to facilitate the division of inventory item processing between automated and manual options, such as between routing an inventory item to be extracted from a container by a human operator or routing an inventory item to be extracted from a container by a robotic manipulator. At various points in the process flow through the inventory system, determinations may be made regarding the suitability of directing inventory items to automated operations in lieu of manual operations. In some aspects, the arrangement of inventory items in standardized containers may facilitate such decision points.

Additionally or alternatively, features described herein may allow a significant number of inventory items on one floor that are needed for operations on another floor to be consolidated for movement up and/or down between vertically arranged floors. Such operations may make use of elevators or other vertical lifts feasible due to a reduction in overall number of trips to be made by such elevators or lifts.

In some embodiments, features described herein may permit different sizes of racks or inventory holders to be used on different floors and reduce (or eliminate) safety concerns that may otherwise be present on floors with human operators. Moreover, use of consolidation stations, distribution stations and/or other features described herein may reduce overall trip times of mobile drive units, and thereby increase overall efficiency and throughput of the inventory system.

Referring now to the figures, FIG. 1 is a flow chart illustrating a process 100 that may be utilized for effective operations of an inventory system such as the inventory system 10 introduced below in FIG. 2.

At 110, item information can be obtained. In some embodiments, the item information may correspond to an identity of an item. For example, the operation at 110 may correspond to scanning an inventory item through a bar code reader or RFID reader and accessing a record for that inventory item in a database. A record for the inventory item may correspond to a Universal Product Code (UPC), an International Standard Book Number (ISBN), stock keeping unit (SKU), or other unique identifier of the item. In some embodiments, the item information additionally or alternatively may correspond to information about a relationship of the item to a container bearing the item. For example, the operation at 110 may correspond to obtaining information about how an item is arranged in a container. Such information may be obtained from cameras (or other sensors), from human operators (e.g., through a keyboard, touchscreen, or other suitable user input), or any other suitable source. As non-limiting examples, the item information may indicate whether a target item is buried under other items in a container, whether the target item is upright or laying down in a container, whether the target item's size relative to the container results in enough space in the container to permit operations within the container by a robotic manipulator, or other information about the arrangement of the item within the container.

At 120, an item classification can be obtained, based on the item information obtained at 110. An item classification may indicate or otherwise be related to an inventory item's suitability for robotic handling.

At 130, a determination may be made about whether the item is classified as suitable for robotic handling. The classification may be based on stored information about the item, such as information about previous attempts to handle the inventory item through robotic manipulators or other automated mechanisms. In some cases, the classification may be indicative that the inventory item has not been handled by automation in a corresponding inventory system in the past, but is known to have sufficient characteristics that warrant routing to robotic handling so that an appropriate strategy for robotic handling can be determined. In some cases, the classification may be based at least in part on an arrangement or other relationship of an item to a container in which the item is located. Other bases for the classification may also exist.

Referring to 140, if the inventory item has been classified as suitable for robotic handling (e.g., yes at 130), instructions may be provided for routing the inventory item to robotic handling for appropriate inventory system operations such as stowing, picking, counting, gift-wrapping, quality checking, or other operations. For example, this may include providing instructions to cause a mobile drive unit or robotic manipulator to facilitate movement of an inventory item to a suitable location for robotic or automated handling. Robotic manipulators may use any suitable end effector (or combination thereof), including but not limited to, soft robotic effectors, vacuum effectors, electro-adhesion effectors, and mechanical or electromechanical effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or ferrofluids (e.g., fluids having suspended ferromagnetic particles capable of altering a size or shape of the fluid volume when subjected to a magnetic field). Vacuum end effectors may grasp inventory items using suction. Electro-adhesion end effectors can include an array of electrodes arranged along a flexible or rigid substrate capable of applying a charge (akin to static electricity) that can adhere an inventory item to the substrate portions that are in contact with the inventory item. Mechanical or electromechanical end effectors may include pinchers, claws, grippers, or other rigid components that may be actuated relative to one another for grasping an inventory item. Other end effectors may also be utilized to facilitate additional techniques. For example, a magnetic or electromagnetic end effector may be useful for grasping inventory items having ferro-magnetic materials. As another example, an end effector may include a platform or other structure that can be placed underneath an inventory item (e.g., by scooping the inventory item or as a result of the inventory item dropping onto the platform) so as to grasp the inventory item by supporting the inventory item from underneath.

Referring to 150, if the inventory item is classified as not suitable for robotic handling (e.g. no at 130) instructions may be provided for routing the inventory item for human handling. For example, this may entail moving the inventory item to a station where a human operator is tasked with handling the inventory item for appropriate inventory system operation such as stowing, picking, counting, wrapping, quality checking, or other operations.

In various embodiments, the process 100 may facilitate efficient usage of resources within the inventory system. In many scenarios, less than all inventory items processed in an inventory system may be suitable for robotic or automated handling. For example, in many cases, appropriate strategies for a particular inventory item or detected orientation have not been developed. In other situations, there may not be sufficient infrastructure for handling certain types of inventory items. For example, a particular inventory system may lack sufficiently strong or gentle robotic manipulators or other components for handling particularly heavy or fragile inventory items respectively. In some aspects, maintaining a record or classification for each inventory item about what inventory items are suitable or not suitable for automation may permit rapid deployment of upgraded technology. For example, inventory items that were once deemed not suitable for automation due to lack of sufficient infrastructure may be recipients of a change to the classification upon new infrastructure being installed in the inventory system. This may allow for dynamic changes to the routing of inventory items within the inventory system to appropriate locations for improving efficiency of handling and maximizing efficiency of robotic operators as well as human operators.

FIG. 2 illustrates the components of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The components and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
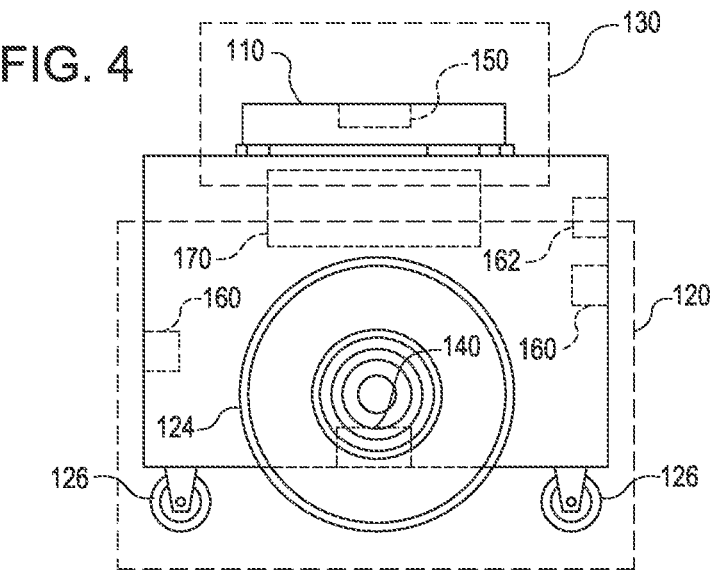
FIGS. 4 and 5 illustrate in greater detail an example mobile drive unit that may be utilized in certain embodiments of the inventory system shown in FIG. 2.
Figure 5:
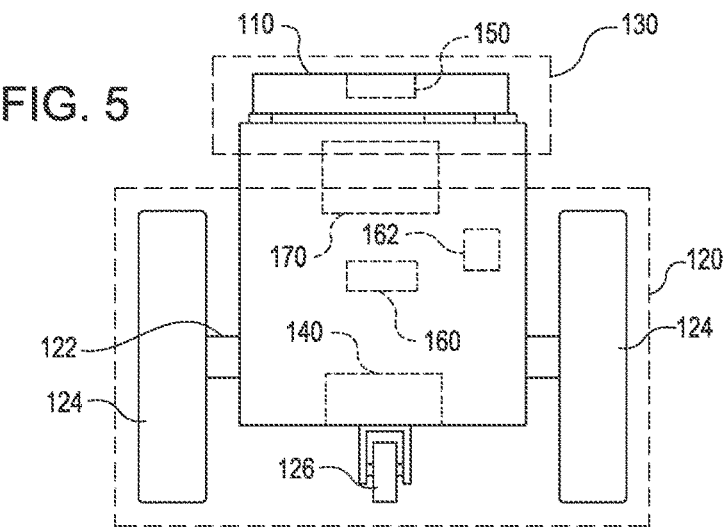

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
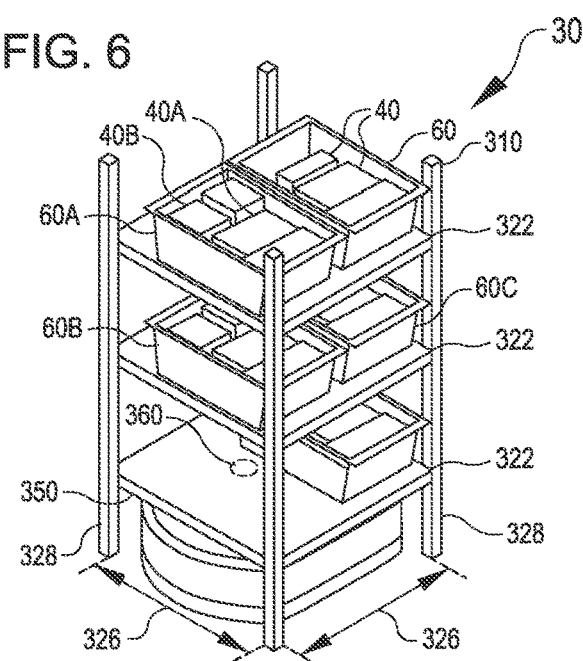
FIG. 6 illustrates in greater detail an example of an inventory holder that may be utilized in certain embodiments of the inventory system shown in FIG. 2.

FIG. 6 illustrates in greater detail the components of a particular embodiment of an inventory holder 30. In particular, FIG. 6 illustrates the structure and contents of an example inventory holder 30 that may be structured for carrying totes 60. The inventory holder 30 illustrated in FIG. 6 is one example of an inventory holder 30 that may be structured as a rack. Other types of inventory holders 30 described herein may also be structured as racks and may include features similar to those shown and described with respect to FIG. 6, although different sizes and/or forms of racks may be used for different purposes, e.g., as described further below. For simplicity, the terms rack and inventory holder are used interchangeably hereafter.

The rack 30 may include any number of faces with similar or different structure. As illustrated, rack 30 includes a frame 310, a plurality of legs 328, and a docking surface 350. Frame 310 holds inventory items, e.g., within totes 60.

Frame 310 provides storage space for storing totes 60 and/or inventory items 40 internal to frame 310. In a particular embodiment, frame 310 is composed of a plurality of inventory shelves 322 stacked one above another and attached to or otherwise supported by legs 328. In alternative embodiments, frame 310 may represent a single inventory shelf 322 configured to receive totes 60. Inventory items 40 may be stored on such a rack 30 by being placed on frame 310. In general, frame 310 may include internal and/or external storage space divided into any appropriate number of inventory shelves 322 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or rack 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of rack 30 that couples to, abuts, and/or rests upon a portion of docking head 110, when mobile drive unit 20 is docked to rack 30. For example, the docking surface 350 may correspond to an underside of a lowermost shelf 322 of the rack 30. Additionally, docking surface 350 supports a portion or all of the weight of rack 30 while rack 30 is docked with mobile drive unit 20. The composition, shape, and/or texture of docking surface 350 may be designed to facilitate maneuvering of rack 30 by mobile drive unit 20. For example, as noted above, in particular embodiments, docking surface 350 may comprise a high-friction portion. When mobile drive unit 20 and rack 30 are docked, frictional forces induced between docking head 110 and this high-friction portion may allow mobile drive unit 20 to maneuver rack 30. Additionally, in particular embodiments, docking surface 350 may include appropriate components suitable to receive a portion of docking head 110, couple rack 30 to mobile drive unit 20, and/or facilitate control of rack 30 by mobile drive unit 20.

Holder identifier 360 marks a predetermined portion of rack 30 and mobile drive unit 20 may use holder identifier 360 to align with rack 30 during docking and/or to determine the location of rack 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of rack 30 as a whole. For example, in particular embodiments, holder identifier 360 may represent a reflective marker that is positioned at a predetermined location on rack 30 and that holder sensor 150 can optically detect using an appropriately-configured camera.

Depending on the configuration and characteristics of mobile drive unit 20 and inventory system 10, mobile drive unit 20 may move rack 30 using a variety of appropriate methods. In a particular embodiment, mobile drive unit 20 is capable of moving rack 30 along a two-dimensional grid, combining movement along straight-line segments with ninety-degree rotations and arcing paths to transport rack 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in rack 30. For example, mobile drive unit 20 may rotate rack 30 to present a particular face of rack 30 to an operator of inventory system 10 or other suitable party, such as a packer selecting inventory items 40 from rack 30. Mobile drive unit 20 may also undock from rack 30. Alternatively, instead of undocking at the second location, mobile drive unit 20 may transport rack 30 back to the first location or to a third location after any appropriate actions have been taken involving inventory items 40. For example, after a particular tote 60 has been removed from rack 30, mobile drive unit 20 may return rack 30 to its original storage location, a new storage location, or another inventory station. Mobile drive unit 20 may then undock from rack 30 at this new location.

In FIG. 6, the rack 30 is shown detachably coupled to the mobile drive unit 20. In some examples, the shelves 322 are configured to removably receive greater or fewer totes 60 than illustrated. The rack 30 may be configured primarily for storing the totes 60 which include inventory items 40 being stored as inventory. Thus, the mobile drive unit 20 may be configured to move the rack 30 to and from a storage area of the workspace 70. In some examples, the rack 30 may be optimized for storing the totes 60 and may enable high density storage of inventory within the totes 60. For example, the one or more shelves 322 of the rack 30 may be sized to receive the totes 60 with very little additional space on any side or above each tote 60, such that the rack 30 may receive totes 60 full of inventory items and thereby provide high density storage. This may include storing inventory for an indefinite duration.

When an inventory item 40 stowed in one of the totes 60 held by the rack 30 is requested (e.g., in a customer order), the mobile drive unit 20 may move the rack 30 to another location in the workspace The tote 60 may be configured to receive one or more inventory items 40 and store such inventory items 40. The totes 60 may include a bottom and multiple side walls that at least partially bound an internal volume in which inventory items 40 may be placed. The totes 60 may have open tops, and in some cases may include flaps that can be folded over to close the open top. The totes 60 may have a box-like or other standardized form-factor that may facilitate automation tasks, such as described further below. To this end, the tote 60 may have a generally rectangular shape and include an opening. In some examples, the totes 60 have different shapes and/or do not have openings. In any event, the totes 60 may be constructed of any suitable material having rigid or semi-rigid characteristics, e.g., which may permit the tote 60 to be durable and re-usable through multiple operations. Such suitable materials include, for example, plastics, metals, paper products, woods, and any other suitable rigid or semi-rigid material.

Figure 7:
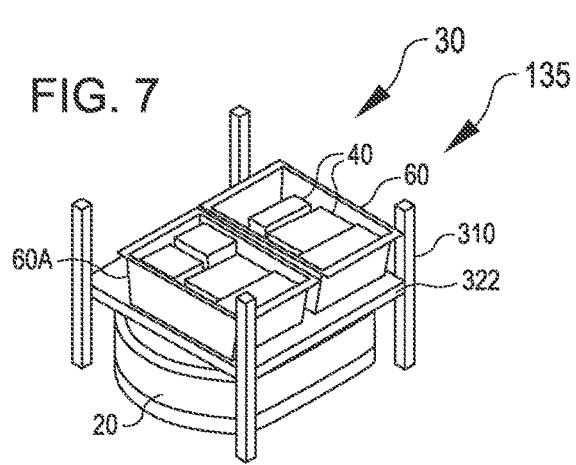
FIG. 7 illustrates in greater detail an example of another inventory holder that may be utilized in certain embodiments of the inventory system shown in FIG. 2.

FIG. 7 illustrates in greater detail the components of another rack 135, e.g., which may be used for different purposes than the rack 30 illustrated in FIG. 6. For example, the rack 135 may be used as a tote shuttle 135 described later herein. Accordingly, to avoid confusion, the rack 135 will be referred to as a tote shuttle 135. The tote shuttle 135 is shown with many characteristics that are similar to the rack 30 discussed herein. For example, the tote shuttle 135 may be configured similarly to the rack 30 such that the tote shuttle 135 can detachably couple with the mobile drive unit 20, removably receive one or more totes 60, etc. Thus, the totes 60 may be compatible with both the tote shuttles 135 and the racks 30. In this manner, the totes 60 may be easily transferred between the tote shuttles 135, the racks 30, temporary storage locations, and other locations within the workspace 70.

Although the tote shuttle 135 is shown with a single shelf 322, in some embodiments, additional shelves 322 may be utilized. In this manner, the tote shuttle 135 may be configured to receive a greater number of the totes 60 than is illustrated in FIG. 7. In some examples, the tote shuttle 135 may have less capacity for holding the totes 60 than the rack 30. This may be because the tote shuttle 135 is configured to hold inventory for a shorter period of time compared to the rack 30. For example, the tote shuttle 135 may indeed be used to "shuttle" the totes 60 between locations in the workspace 70. At the same time, the racks 30 may function practically as "inventory shelves" to stow the inventory items 40 in the workspace 70. In some examples, the racks 30 stow the inventory items 40 until the inventory items 40 are needed elsewhere (e.g., as part of an order, to be counted, to be removed to another storage location, or for any other suitable reason).

In some examples, the tote shuttle 135 may be optimized for picking the inventory items 40 from within the totes 60. To this end, the tote shuttle 135 may be designed in a manner that enables easy presentment of open top portions of the totes 60 to a human operator or an automated operator. For example, the shelf 822 may be arranged on the rack 135 at an angle such that the contents of the totes 60 may be more easily accessible to operators.

Figure 8:
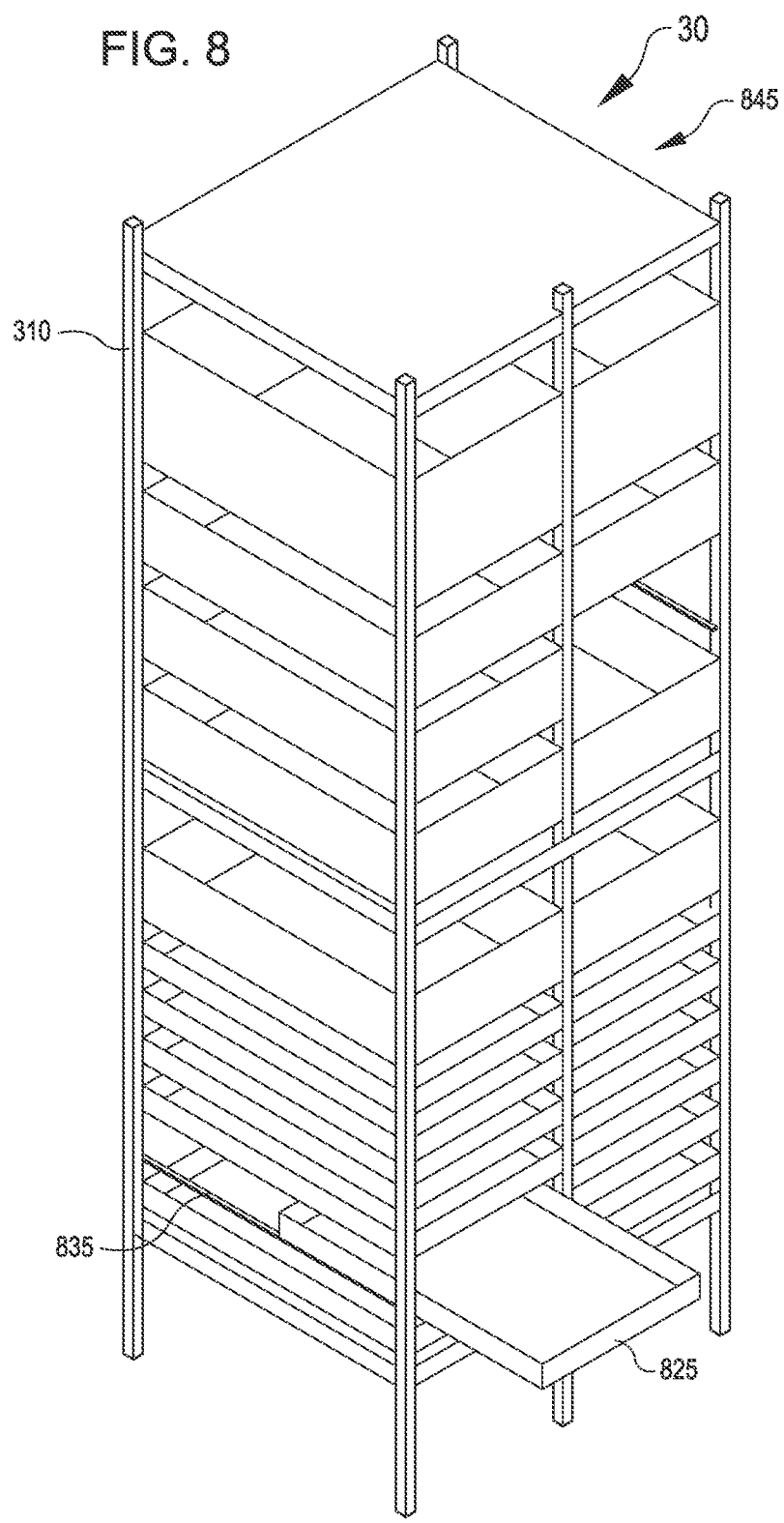
FIG. 8 illustrates in greater detail an example of a further inventory holder that may be utilized in certain embodiments of the inventory system shown in FIG. 2.

FIG. 8 illustrates another inventory holder or rack 30 that may be utilized. The rack 30 shown in FIG. 8 may correspond to a tray rack 845. The tray rack 845 may include rails 835 or other suitable structure for receiving trays 825 in the frame 310 of the tray rack 845. The trays 825 may be shorter in depth than totes 60. The trays 825 may be sized facilitate top down robotic manipulators grasping inventory items from the trays 825.

As described above, embodiments herein are directed to or may include determinations of when an inventory item 40 is suitable for automation. Such determinations may be made at various points in the process through an inventory system 10. For example, various such determinations are illustrated at different points in the process flow shown in FIG. 9.

Figure 9:
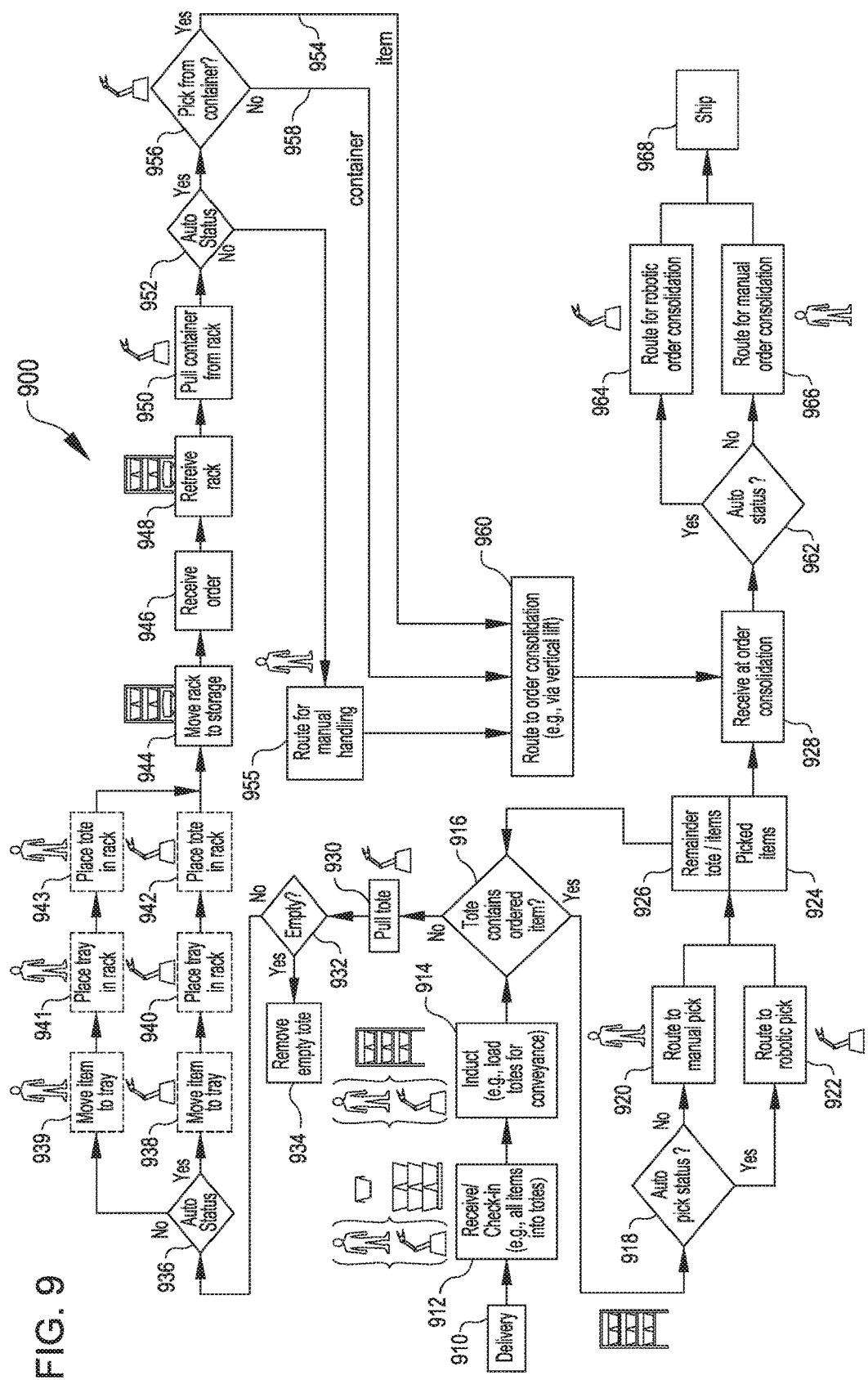
FIG. 9 illustrates a process flow that may be used in certain embodiments of the inventory system shown in FIG. 2.

FIG. 9 shows a process flow 900 that may be utilized in the inventory system 10. At 910, inventory can be introduced to the inventory system through delivery, for example, through delivery trucks or other delivery vehicles.

At 912, inventory items from delivery trucks or other delivery vehicles may be received and/or checked into the inventory system. This process may include moving all inventory items into totes to facilitate subsequent operations in the inventory system 10. In some instances, these operations may be facilitated by a human and/or robotic operators. In some aspects, the check-in process at 912 may include putting inventory items into individual totes and/or assembling totes into stacks on pallets or receiving inventory items in such organizational schemes.

At 914, totes may be loaded for conveyance to other locations in the system. This may include loading totes into racks (e.g., such as the tote rack 30 of FIG. 6). Other conveyance mechanisms, including but not limited to conveyor belts, may also be used. Upon induction 914, totes may be available for access in the inventory system 10 for filling orders for inventory items 40.

At 916, a determination may be made whether a particular tote contains an ordered inventory item. In various embodiments, this determination may permit orders having only a single inventory item (or a few inventory items all readily available in checked-in totes) to be fulfilled without passing the relevant inventory item or items through storage in a time-consuming fashion. If a particular tote does contain one or more ordered inventory items (e.g., yes at 916), a determination at 918 may be made to determine whether the tote is suitable for automated picking. This determination may correspond to the determination at 130 in FIG. 1 and may be based at least in part on a classification linked to item information available for a particular inventory item such as an identity or arrangement of the item within a container (e.g., as at 110 and 120 in FIG. 1).

At 920, if the classification indicates that the inventory item 40 or the tote 60 is not suitable for picking through automated elements (e.g., no at 918), the inventory item 40 can be routed for manual picking, such as by movement of the tote 60 carrying the inventory item 40 to a station at which a human operator is located and instructed to manually remove the ordered inventory item 50 from the tote 60.

At 922, if the classification indicates that the inventory item 40 or the tote 60 is suitable for picking through automated elements (e.g., 918 yes), the inventory item 40 can be routed for robotic picking. For example, this may include routing the inventory item 40 and/or tote 60 to a station that includes a robotic manipulator that can access the tote 60 for extracting the inventory item 40 for further processing.

Manual picking at 920 and/or automatic picking at 922 may result in one or more picked inventory items 924 that are separated from a remainder 926 (e.g., the tote and other remainder inventory items in the tote). The picked inventory items 924 can be received at order consolidation at 928 and subsequently processed for consolidation for orders or combined with other inventory items received through storage or that were previously placed in storage or retrieved from storage. The remainder tote and/or inventory items at 926 may be reevaluated (e.g., returning to the decision at 916 in the process flow) to determine if the tote contains other ordered inventory items. If so, the cycle described through operation 918, etc. may be repeated.

If a tote is determined not to include or contain an ordered inventory item (e.g., no at 916), the tote may be routed for subsequent processing. For example, at 930, a robotic manipulator may pull the tote. This may involve removing the tote from a conveyance or rack, etc.

At 932, a determination may be made whether the tote is empty. If empty (e.g., yes at 932), the empty tote may be removed (e.g., as at 934) such as to make more room in appropriate conveyance mechanisms and/or to produce additional totes for storage of other inventory items (e.g., as at 912).

If the tote is not empty (e.g., no at 932), the tote may be evaluated at 936 to determine whether it is suitable for subsequent robotic handling. This determination may correspond to the determination at 130 in FIG. 1 and may be based at least in part on a classification linked to item information available for of a particular inventory item such as an identity or arrangement of the item within a container (e.g., as at 110 and 120 in FIG. 1).

If classified as suitable for robotic handling (e.g., yes at 936), the tote may be appropriately processed to facilitate subsequent robotic handling. For example, at 938, the tote may have inventory items removed by a robotic arm and placed into a tray such as the tray 825 from the tray rack 845 of FIG. 8. At 940, the robotic arm may move the tray and place the tray 825 into the tray rack 845. The robotic arm that performs the operation of storing and removing the tray

825 may be a different variety of robotic arm than that used at 938. For example, the robotic arm at 940 may be less dexterous or sophisticated due to a lesser need to perform a more precise or wider variety of operations.

In some embodiments, a robotic arm (e.g., as at 942) may place a tote in a rack for subsequent storage. In some cases, a tote may be placed directly in a rack without having inventory items removed from it for placement in a tray (e.g., without being subject to the operation shown at 938). In other embodiments, one or more inventory items may be removed from a tote for placement in a tray prior to the tray being stored in a rack (e.g., the tote may be subject to the operation shown at 938). In some instances, a robotic manipulator may be utilized to re-arrange items within a tote into an arrangement that facilitates other subsequent robotic handling (e.g., which operation may be performed in addition to or in lieu of the operation shown at 938). At 944, the rack containing suitable trays and/or totes (e.g., collectively, containers) may be moved to storage, e.g., to await an order related to inventory items designated for robotic handling.

If classified as unsuitable for robotic handling (e.g., no at 936), the tote may be appropriately processed to facilitate subsequent manual handling. In some examples, this may correspond to a mobile drive unit moving a rack with totes or other containers designated for manual handling to storage (as at 944), e.g., to await an order related to inventory items designated for such manual handling. In some embodiments, totes and/or inventory items may undergo manual handling by a human operator to make them suitable for robotic handling. For example, as shown at 939, 941, and 943, in some embodiments, manual handling may include a human operator performing similar actions to the actions shown at 938, 940, and/or 942 (e.g., moving items into trays, placing trays into racks, re-arranging items in totes, and/or placing totes into racks) so that a rack with totes or other containers can be moved to storage with containers arranged to facilitate later robotic handling. Thus, in some embodiments, a classification of an item may be changed from a status of unsuitable for robotic handling to a status of suitable for robotic handling in response to manual handling utilized to make an item ready for subsequent robotic handling. In some embodiments, a totes and/or inventory items that are designated for automated handling may be located in the same or a different storage area from totes and/or inventory items that are designated for manual handling.

At 946, an order may be received for inventory items that have been placed in storage. At 948, inventory items or a rack containing inventory items may be retrieved from storage (e.g., based on commands from a management module 15 to a mobile drive unit 20). At 950, a robot arm may pull a container (e.g., a tote or a tray from a rack).

At 952, an additional or alternative determination may be made regarding whether the ordered inventory item may be suitable for handling via automation. This determination may correspond to the determination at 130 in FIG. 1 and may be based at least in part on a classification linked to item information available for a particular inventory item such as an identity or arrangement of the item within a container (e.g., as at 110 and 120 in FIG. 1). In some embodiments, the determination at 952 may be based at least in part on or made in lieu of the determination made at 936. For example, in some situations, the determination at 936 may determine how or where an item is stored, and the determination at 952 may correspond to routing for manual or automated operations based at least in part on an association with a type of storage from which the item is retrieved and/or based at least in part on a classification of the item when stored.

If determined not suitable for automation (e.g., no at 952), the inventory item and/or container may be routed for manual handling as at 955. In some aspects, the routing for manual handling at 955 may correspond to routing to a station so that a human operator can move, re-arrange, or otherwise manipulate inventory items so as to be ready for subsequent robotic handling. In some aspects, the routing for manual handling at 955 may correspond to designating a container to be ultimately transferred to a station at which a human operator can remove items for order fulfillment and/or perform other operations relative to inventory items.

If an inventory item is determined to be suitable for robotic handling (e.g., yes at 952), the item may be routed for subsequent robotic handling. This may include making a determination as at 956 of whether to pick an item from the container for subsequent transfer. For example, the determination at 956 may be based on whether suitable robotic manipulator infrastructure is available for removing an item for subsequent transfer for order consolidation. If it is determined to pick an item from the container for subsequent transfer (e.g., yes at 956, such as if suitable infrastructure is available), a robotic manipulator may pick from the container (e.g., from the tray or tote) to separate the item for transfer as at 956. Alternatively, (e.g., no at 956, such as if the container is deemed to be suitable for robotic picking even though infrastructure may be unavailable for picking particular items from the container for subsequent transfer), the entire container may be removed from a rack without removing inventory items therein and sent as-is for subsequent processing (e.g., as at 958).

At 960, inventory items retrieved from storage at 948 may be routed to order consolidation (e.g., regardless of whether retrieved from storage with routing for manual operation such as at 955 or with routing for automated operations such as at 954 or 958). For example, inventory items retrieved from storage 948 may be routed to order consolidation at 960 via a vertical lift, such as the vertical lift 1012 described in greater detail below with respect to FIG. 10.

Thus, inventory items retrieved from storage at 948 and routed to order consolidation at 960 may be received for order consolidation at 928, in addition to or as alternatives to picked inventory items 924 that were processed without travelling to storage.

At 962, an additional or alternative determination may be made about whether inventory items at order consolidation are suitable for automated handling. This determination may correspond to the determination at 130 in FIG. 1 and may be based at least in part on a classification linked to item information available for a particular inventory item such as an identity or arrangement of the item within a container (e.g., as at 110 and 120 in FIG. 1). In some embodiments, the determination at 962 may be based at least in part on or made in lieu of the determinations made at 918, at 936, and/or at 952.

If items are determined to be suitable (yes at 962), at 964, inventory items may be routed for robotic order consolidation. For example, this may include robotic manipulators pulling out inventory items from containers to place into shipping containers. If inventory items are deemed as not suitable for robotic manipulation (e.g., no at 962), they may be routed as at 966 to manual order consolidation, such as to a station with a human operator tasked with pulling out inventory items from containers to place into shipping containers.

At 968, inventory items consolidated into orders by robotic operators and/or human operators may be appropriately shipped from the facility 70 for movement to other locations such as ultimate recipients of the orders or other facilities 70.

Figure 10:
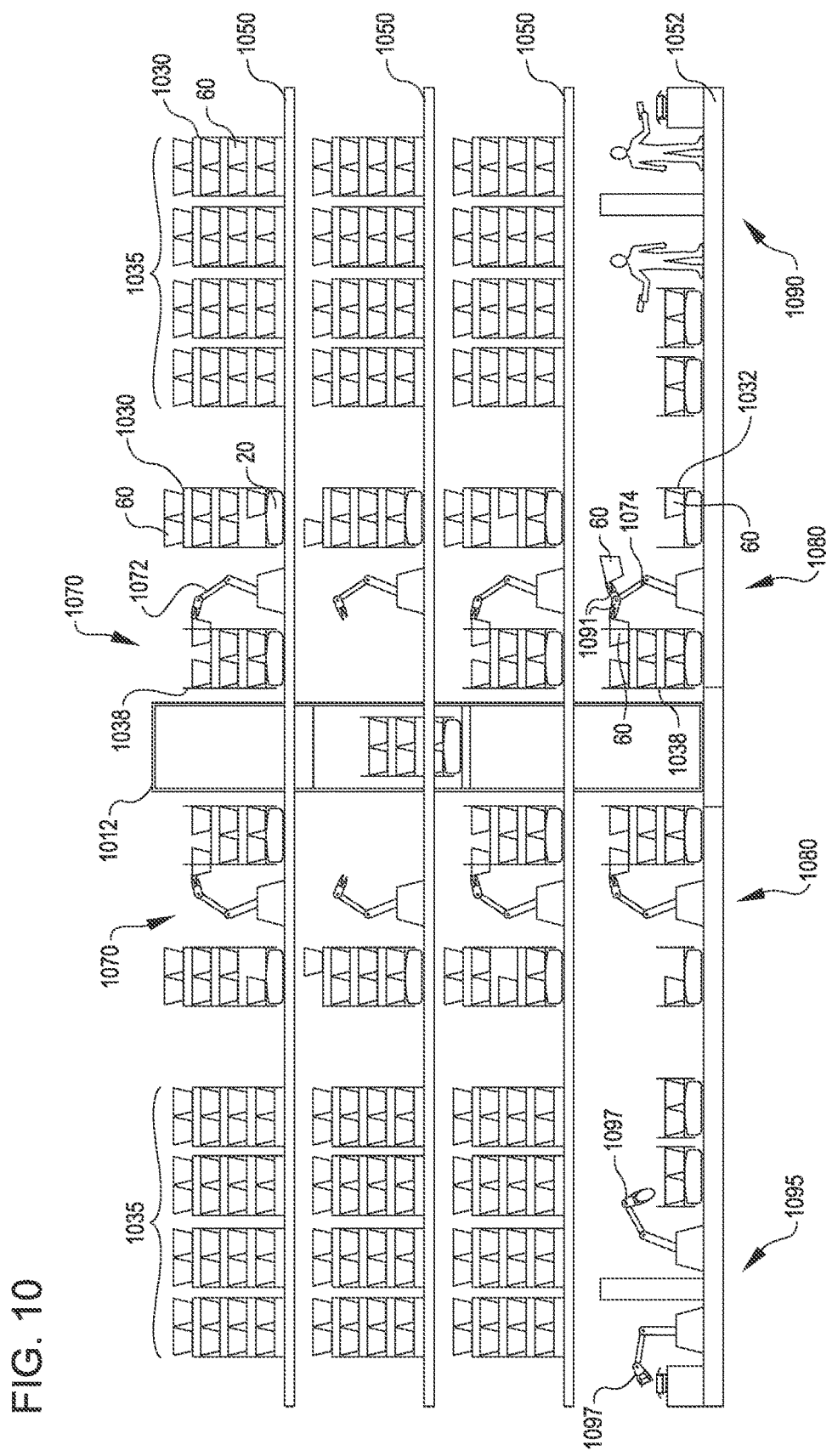
FIG. 10 illustrates a side elevation view of multiple floors that may be used in certain embodiments of the inventory system shown in FIG. 2.

FIG. 10 illustrates a side view of a multi-floor arrangement that may be used for an inventory system 10. The illustrated arrangement includes multiple storage floors 1050 and a processing floor 1052. Other numbers or combinations of storage floors 1050 and processing floors 1052 may additionally or alternatively be used. The storage floors 1050 may include storage areas 1035. For example, storage areas 1035 may include storage racks 1030 with containers 60 having inventory items stored therein. The storage floors 1050 may also include consolidation stations 1070.

The depicted consolidation stations 1070 feature a robotic arm 1072 for moving or transferring totes 60 from storage racks 1030 to transfer racks 1038. In some aspects, the transfer racks 1038 can be of a smaller size than the storage racks 1030. For example, the transfer racks 1038 are shown with three levels in FIG. 10 whereas the storage racks 1030 are shown with four levels of tote storage capacity. The consolidation stations 1070 may be positioned adjacent or nearby vertical lifts 1012. The vertical lifts 1012 may correspond to any suitable conveyance mechanism for moving transfer racks 1038 between storage floors 1050 and the processing floor 1052. Examples include elevators, cranes, and/or a rack gear (e.g., which in an illustrative example may be positioned along a wall or column and be engageable by a mobile drive unit 20 in such a way that the mobile drive unit 20 engages the rack and drives the vertical movement of the unit and container up and/or down). The consolidation stations 1070 may be operated to facilitate efficient operation of the lifts 1012. For example, the robotic arms 1072 at the consolidation stations may operate to remove totes 60 and/or corresponding inventory items from storage racks 1030 for insertion into transfer racks 1038.

The management module 15 may instruct mobile drive units 20 to move storage racks 1030 to the consolidation stations 1070. Containers can be removed from the storage racks 1030 and placed onto transfer racks 1038. Multiple iterations of this process of bringing a storage rack 1030 to a transfer station 1070 and transferring a container such as a tote 60 or a tray to a transfer rack 1038 can cause a transfer rack to be filled with containers that each contain inventory items designated for orders to be processed on the processing floor 1052. Such consolidation can make travel of inventory holders more efficient when traveling down the elevators 1012.

Figure 11:
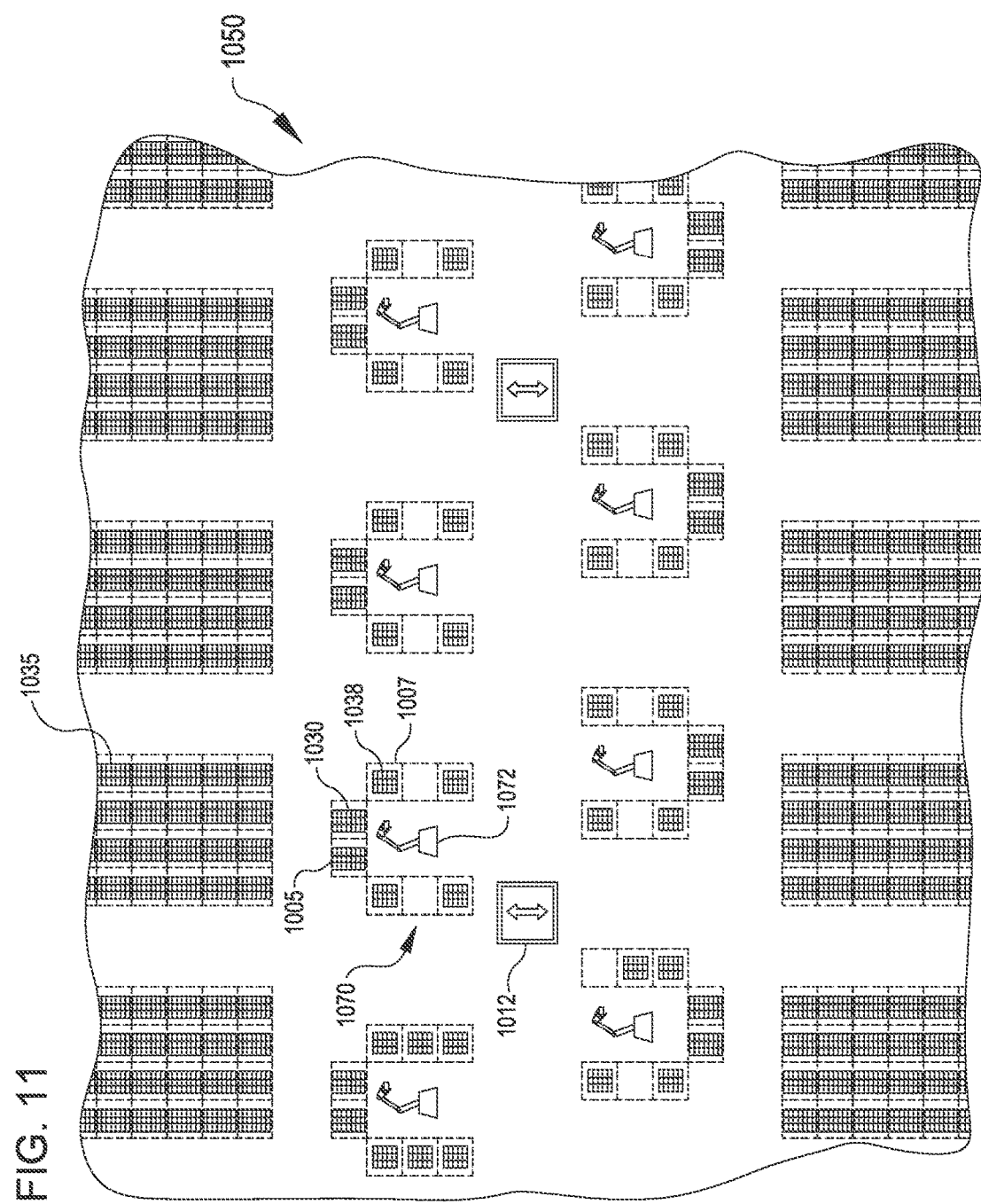
FIG. 11 shows a top plan view of an example of an inventory storage floor having consolidation stations that facilitate movement of inventory between the floors illustrated in FIG. 10.

Referring to FIG. 11, in some embodiments, the consolidation stations 1070 may be arranged for interacting with multiple storage racks 1030 and/or multiple transfer racks 1038. For example, each of the consolidation stations 1070 shown in FIG. 11 include two cells 1005 (shown facing the storage areas 1035) for receiving respective storage racks 1030 and six cells 1007 (shown divided among both lateral sides of the station 1070) for receiving respective transfer racks 1038. Consolidation stations 1070 are not limited to this ratio, however, and may additionally or alternatively include any other number of cells 1005 for receiving storage racks 1030 and/or any other number of cells 1007 for receiving respective transfer racks 1038. Including multiple cells 1005 for storage racks 1030 may allow one storage rack 1030 to be accessed by the robotic manipulator 1072 while another storage rack 1030 is moved into or out of place for cycling through different storage racks 1030. In some embodiments, more cells 1007 for the transfer racks 1038 than cells 1005 for the storage racks 1030 may be provided because the mobile drive units 20 may move the storage racks in and out of cells 1005 with greater frequency than transfer racks 1038 are moved from other cells 1007 at the consolidation station 1070.

Referring again to FIG. 10, the management module 15 may instruct mobile drive units 20 to move transfer racks 1038 from the consolidation stations 1070 to the distribution stations 1080 on the processing floor 1052 via the vertical lifts 1012. At the distribution stations 1080, a containers 60 from the transfer racks 1038 may be placed onto a shuttle rack 1032 for routing to a manual pick station 1090 or an automatic pick station 1095. In some embodiments, the shuttle racks 1032 may be sent to other distribution stations 1080, e.g., for transfer of totes or other inventory to areas served by the other distribution stations 1080. In some aspects, the shuttle racks 1032 can be of a smaller size than the transfer racks 1038. For example, the transfer racks 1038 are shown with three levels in FIG. 10 whereas the shuttle racks 1032 are shown with one level of tote storage capacity. In some examples, using different size racks near human operators than racks that are used near robot operators may permit larger racks to be used than might otherwise be feasible due to concerns about safety or accessibility for human operators.

Figure 12:
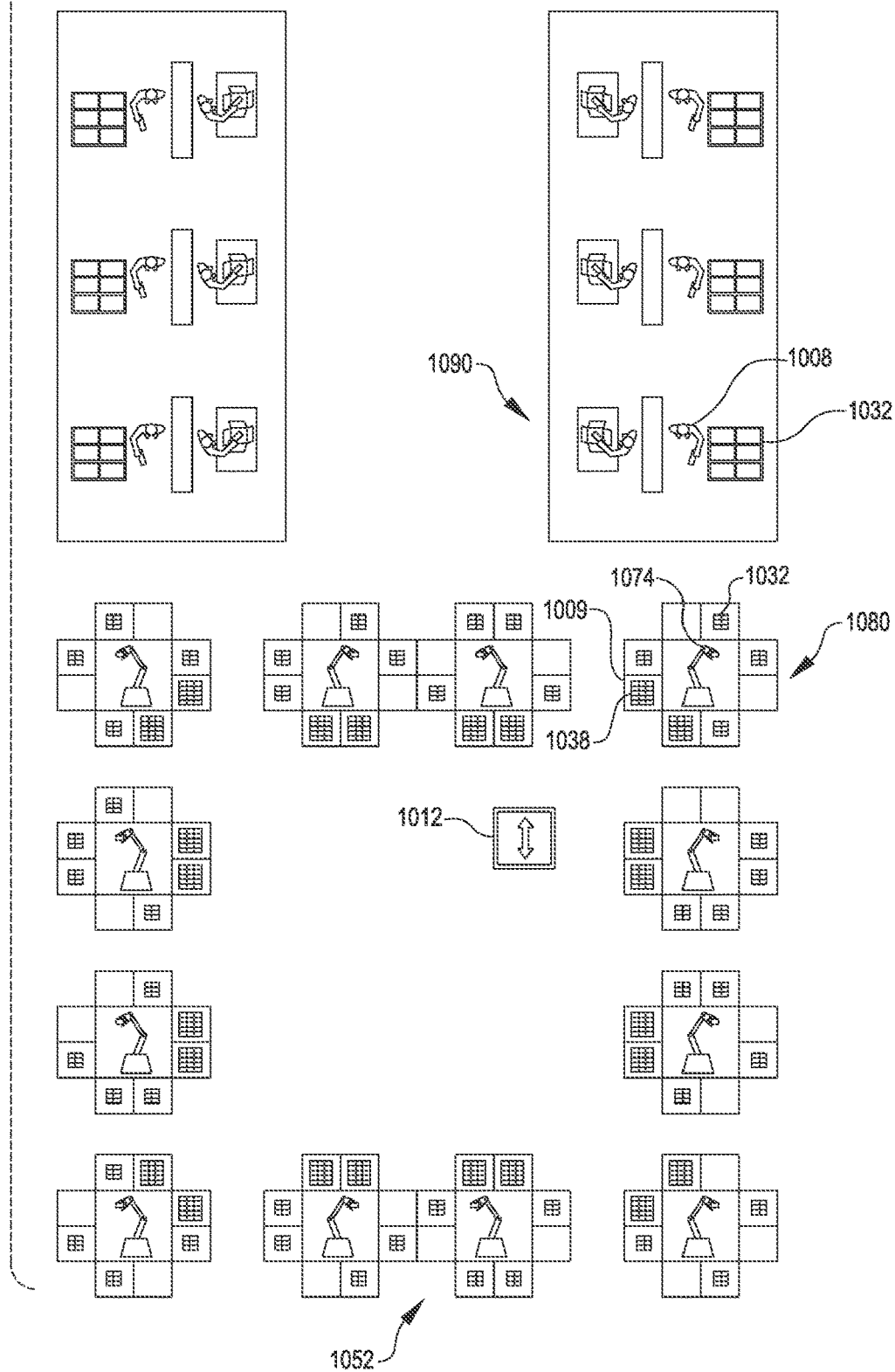
FIG. 12 illustrates a top plan view of an inventory processing floor that may include distribution stations that facilitate movement of inventory between the floors illustrated in FIG. 10.

Referring to FIG. 12, in some embodiments, the distribution stations 1080 may be arranged for interacting with multiple transfer racks 1038 and/or multiple shuttle racks 1032. For example, transfer racks 1038 arriving to the processing floor 1052 via the lift 1012 may be routed to respective distribution stations 1080 and received in cells 1009, e.g., which may be cells 1009 that are nearest the lift 1012. Robotic manipulators 1074 in distribution stations 1080 may transfer containers from the transfer racks 1038 to shuttle racks 1032 in other cells 1009. Although each of the distribution stations 1080 shown in FIG. 12 include two cells 1009 for receiving respective transfer racks 1038 and six cells 1009 for receiving respective shuttle racks 1032, distribution stations 1080 are not limited to this ratio and may additionally or alternatively include any other number and/or arrangement of cells 1009. The shuttle racks 1032 may be transferred to manual processing stations 1090, for example, for consolidation of orders by human operators 1008. The shuttle racks 1032 additionally or alternatively may be transferred to automated processing stations 1095 (e.g., FIG. 10), for example, for consolidation of orders by robotic manipulators 1097.

Shuttle racks 1032 may be sent to distribution stations 1080 upon completion of delivery of inventory items to be picked for order consolidation. The remaining totes having additional inventory items not picked for such processes may be transferred from shuttle racks 1032 into transfer racks 1038 by robotic arms 1074. For example, the robotic arm 1074 may have multiple hands or other grippers 1091 such that the arm or manipulator 1074 can pull one tote from a shuttle rack 1032 with one gripper and then pull another tote from the transfer rack 1038 with another gripper and place the first tote into the transfer rack with the first gripper, thus performing the swap without setting down a tote to make room for swapping in another tote. In this way, the distribution station 1080 may swap totes directly from transfer racks 1038 with ordered inventory to shuttle racks 1032 and totes with excess inventory that is to be stored from shuttle racks 1032 to transfer racks 1038 for transfer back to storage floors. Thus, efficient operations of the vertical lift may be obtained not only due to transfer racks 1038 coming down the vertical lift 1012 with a high density of totes having inventory items that are designated for use with particular orders (as noted above), but additionally or alternatively efficient operations of the vertical lift may be obtained due to transfer racks 1038 going up the vertical lift 1012 with a high density of totes having inventory items that are designated for storage.

Moreover, when the transfer racks 1038 go up the lift 1012 to arrive at a particular consolidation station 1070, totes or trays or containers may be removed from the transfer racks 1038 and placed into storage racks 1030 in a swapping arrangement that replenishes density of inventory items that are demanded on the processing floor 1052. In this manner, storage racks 1030 may be sent back away from the consolidation stations 1070 with almost exclusively inventory items that are designated for storage or not yet designated for orders or other operations on the processing floor 1052.

Figure 13:
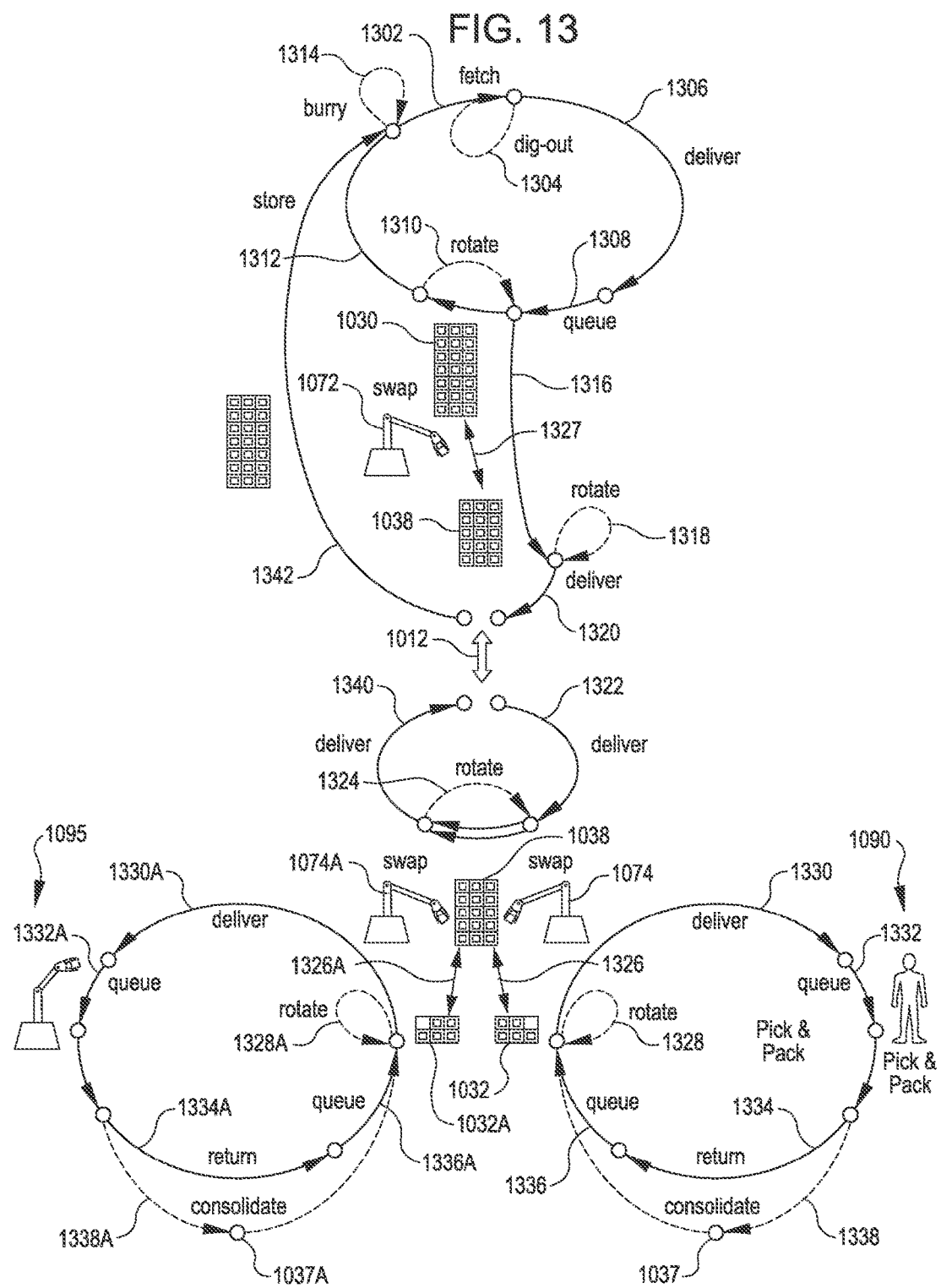
FIG. 13 illustrates movement of mobile drive units that may be used in certain embodiments to facilitate movement of inventory between the floors illustrated in FIG. 10.

FIG. 13 illustrates routes or tasks that may be assigned to mobile drive units 20, for example with respect to the arrangement described with respect to FIG. 10. As may be appreciated with reference to FIG. 13, in various embodiments, implementing the arrangement described with respect to FIG. 10 and/or other arrangements described herein may permit mobile drive units 20 to travel shorter distances or otherwise be more efficiently used within the system 10.

At 1302, a mobile drive unit may be sent to fetch a storage rack 1030 from a storage area 1035. The mobile drive unit may, at 1304, be tasked with "digging out" the storage rack 1030. This may correspond to moving other storage racks 1030 out of the way of the selected storage rack 1030 designated for retrieval or fetching. At 1306, the mobile drive unit may be tasked with delivering the storage rack 1030 to a consolidation station 1070. The delivery task at 1306 may thus be considerably shorter than if the mobile drive unit were tasked with also carrying the storage rack 1030 down the vertical lift 1012. Moreover, the duration or distance associated with delivery task at 1306 may be further reduced due to the mobile drive unit 20 having the option to travel to the nearest of multiple consolidation stations 1070 from storage when multiple consolidation stations 1070 are implemented on a given storage floor 1050.

At 1308, the mobile drive unit may queue and wait its turn to deliver the storage rack 1030 to the consolidation station 1070. Inventory may be swapped from the storage rack 1030 to the transfer rack 1038 by the robotic manipulator 1072 at the consolidation station 1070 as at 1327. The mobile drive unit at 1310 may be tasked with rotating the storage rack 1030 so that another face is presented for the robotic manipulator 1072 to access contents of the storage rack 1030. In some aspects, at 1312, the mobile drive unit may be tasked with taking the storage rack 1030 back to a storage area 1035. In storage, the mobile drive unit may also be tasked with "burying" the storage rack 1030 (e.g., at 1314).

In some aspects, at 1316, a mobile drive unit rather than being tasked with movement of a storage rack 1030 may be tasked with moving a transfer rack 1038, such as for queuing the transfer rack 1038 at the consolidation station 1070. The mobile drive unit at 1318 may be tasked with rotating the transfer rack 1038, for example, so that the robotic manipulator 1072 at the consolidations station 1070 can swap totes on a different face of the transfer rack 1038. At 1320, the mobile drive unit may be tasked with delivering the transfer rack 1038 on the storage floor 1050 to the vertical lift 1012. In some aspects, the use of transfer racks 1038 that have been loaded with a high density of items and/or containers that are designated for use on another floor may result in a reduced number of trips corresponding to path 1320 in FIG. 13 and increase overall efficiency of the system 10.

In some embodiments, the mobile drive unit may accompany the transfer rack 1038 down the vertical lift 1012. In other embodiments, the mobile drive unit 20 may remain on the storage floor 1050.

At 1322, a mobile drive unit on the processing floor 1052 may be tasked with delivering the transfer rack 1038 to an order distribution station 1080. Similar to 1320, the use of transfer racks 1038 that have been loaded with a high density of items and/or containers that are designated for use on the processing floor 1052 may result in a reduced number of trips corresponding to path 1322 in FIG. 13 and increase overall efficiency of the system 10. Moreover, the duration or distance associated with delivery task at 1322 may be further reduced due to the mobile drive unit 20 having the option to travel to the nearest available of multiple distribution stations 1080 when multiple distribution stations 1080 are implemented on a given processing floor 1052.

At 1324, a mobile drive unit may be tasked with rotating the transfer rack 1038, for example, to facilitate swapping actions by the robotic manipulator 1074 at the distribution station 1080. Inventory may be swapped from the transfer rack 1038 to the shuttle racks 1032 by the robotic manipulator 1074 at the distribution station 1080 as at 1326.

In some aspects, a mobile drive unit rather than being tasked with movement of a transfer rack 1038 may be tasked with moving a shuttle rack 1032. For example, a mobile drive unit at 1328 may be tasked with rotating the shuttle rack 1032, for example, to present another face to the robotic manipulator 1074. At 1330, the mobile drive unit may be tasked with moving the shuttle rack 1032 toward a station 1090 with human operators. The mobile drive unit at 1332 may be tasked with navigating the queue for such a station. In some embodiments, a rotation is not necessary at the pick and pack station 1090 because the containers presented there are all accessible to the human operator. Moreover, the duration or distance associated with delivery task at 1330 may be reduced due to the mobile drive unit 20 having the option to travel to the nearest of multiple available processing stations 1090 when multiple processing stations 1090 are implemented on a given processing floor 1052.

In some aspects, the mobile drive unit at 1334 is tasked with returning the shuttle rack 1032 toward the distribution station 1080. The duration or distance associated with delivery task at 1334 may be reduced due to the mobile drive unit 20 having the option to travel to the nearest available of multiple distribution stations 1080 when multiple distribution stations 1080 are implemented on a given processing floor 1052. At 1336, the mobile drive unit may queue the shuttle rack 1032 for the distribution station 1080. In some aspects, the mobile drive unit at 1338 may alternatively transport a shuttle rack 1032 to an alternate location 1037 to facilitate consolidating inventory items from various containers such as totes or trays in the shuttle rack 1032 into a smaller number of containers. For example, this may provide increased density when the shuttle rack 1032 has containers transferred from it to the transfer rack 1038 at the distribution station 1080.

In some embodiments, similar actions (e.g., designated with a suffix of A) may be performed with respect to a pick and pack station 1095 having robotic operators or other automated manipulators.

Turning again to the transfer rack 1038, at 1340, the mobile drive unit may deliver a transfer rack 1038 that has been filled with inventory items not immediately needed (and thus designated for storage) to the vertical lift 1012. In some embodiments, the mobile drive unit may accompany the transfer rack 1038 up the vertical lift. In other embodiments, the mobile drive unit may remain on the process and pack floor 1052. Similar to 1320 and 1322, the use of transfer racks 1038 that have been loaded with a high density of items and/or containers that are designated for storage on a storage floor apart from the processing floor may result in a reduced number of trips corresponding to path 1340 in FIG. 13 and increase overall efficiency of the system 10.

At 1342, in some embodiments, the mobile drive unit may be tasked with taking a storage rack 1030 from the consolidation station 1070 to storage. In some embodiments, a transfer rack that is full of inventory items to be stored may additionally or alternatively be carried by the mobile drive unit at 1342 for storage. Accordingly, although FIG. 10 shows transfer racks and storage racks of different sizes, in some embodiments, racks of the same size may be used for both functions. Thus, similar to 1320, 1322, and 1340, the use of transfer racks 1038 that have been loaded with a high density of items and/or containers that are designated for storage on a storage floor apart from the processing floor may result in a reduced number of trips corresponding to path 1342 in FIG. 13 and increase overall efficiency of the system 10. Alternatively, if the mobile drive unit is instead tasked at 1342 with moving a transfer rack 1038 from the vertical lift 1012 to the consolidation station 1070, the duration or distance associated with delivery task at 1342 may be reduced due to the mobile drive unit 20 having the option to travel to the nearest available of multiple consolidation stations 1070 from the vertical lift 1012 when multiple consolidation stations 1070 are implemented on a given storage floor 1050.

Based at least in part on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory system, comprising:
   a manual station within a facility and configured for operations performed relative to inventory items by human operators;
   an automated station within the facility and comprising a robotic manipulator and configured for operations performed relative to at least some of the inventory items by the robotic manipulator;
   containers configured for carrying at least some of the inventory items;
   racks each configured for carrying at least some of the containers;
   mobile drive units configured for moving the racks between locations within the facility; and
   a management module configured to:
      receive item information about a selected inventory item that is carried within a selected container of the containers, the item information comprising at least one of an identity of the selected inventory item or information about an arrangement of the selected inventory item within the selected container;
      determine a classification for the selected inventory item based at least in part on the item information about the selected inventory item, the classification comprising:
         a manual classification indicating that the selected inventory item is designated for manual handling corresponding to an operation to be performed relative to the selected inventory item by a human operator, or
         an automatic classification indicating that the selected inventory item is designated for automated handling corresponding to an operation to be performed relative to the selected inventory item by the robotic manipulator; and instruct a selected mobile drive unit of the mobile drive units to move a selected rack carrying the selected container so as to:
  move the selected container to the manual station if the classification of the selected inventory item comprises the manual classification; or
  move the selected container to the automated station if the classification of the selected inventory item comprises the automatic classification.

2. The inventory system of claim 1, wherein the management module is further configured to determine instructions for storage of the selected inventory item based at least in part on whether the classification is the automatic classification or the manual classification.

3. The inventory system of claim 1, wherein the management module is further configured to determine instructions for retrieval from storage of the selected inventory item based at least in part on whether the classification is the automatic classification or the manual classification.

4. The inventory system of claim 1, wherein the management module is further configured to change the classification for the selected inventory item based on information received about a change in automated operations available relative to the selected inventory item.

5. A management module for an inventory system, the management module comprising a non-transitory computer-readable storage medium having stored therein instructions that, when executed by one or more processors of a computer system, cause the computer system to at least:
  receive item information about a selected inventory item, the item information comprising at least one of an identity of the selected inventory item or information about an arrangement of the selected inventory item within a selected container containing the selected item;
  access a classification for the selected inventory item based at least in part on the item information about the selected inventory item;
  provide instructions for routing the selected inventory item based at least in part on the classification accessed, the instructions for routing comprising:
    instructions for causing the selected inventory item to be routed for manual handling if the classification of the selected inventory item indicates that the selected inventory item is designated for an operation to be performed relative to the selected inventory item by a human operator; or
    instructions for causing the selected inventory item to be routed for automated handling if the classification of the selected inventory item indicates that the selected inventory item is designated for an operation to be performed relative to the selected inventory item by a robotic manipulator.

6. The management module of claim 5, wherein the instructions when executed further cause the computer system to:
  provide instructions to cause a mobile drive unit to move a rack carrying the selected inventory item based at least in part on the instructions for routing the inventory item.

7. The management module of claim 5, wherein the instructions for routing the selected inventory item comprises instructions for routing a container carrying the selected inventory item.

8. The management module of claim 5, wherein the classification is based at least in part on an assessment of whether the robotic manipulator is capable of satisfying parameters for performing an operation of removing the selected inventory item from a container carrying the selected inventory item.

9. The management module of claim 5, wherein the instructions when executed further cause the computer system to:
  determine instructions for storage of the selected inventory item based at least in part on the classification.

10. The management module of claim 5, wherein the instructions when executed further cause the computer system to:
  provide, if the classification of the selected inventory item indicates that the selected inventory item is designated for an operation to be performed relative to the selected inventory item by a robotic manipulator, instructions to cause the selected inventory item to be transferred into a container and at an orientation configured to facilitate performance by the robotic manipulator of an operation of removing the selected inventory item from the container.

11. The management module of claim 5, wherein the instructions when executed further cause the computer system to:
  determine instructions for retrieval from storage of the selected inventory item based at least in part on the classification.

12. The management module of claim 5, wherein the instructions when executed further cause the computer system to:
  change the classification for the selected inventory item based on information received about a change in automated operations available relative to the selected inventory item.

13. A method comprising:
  obtaining item information about a selected inventory item, the item information comprising at least one of an identity of the selected inventory item or information about an arrangement of the selected inventory item within a selected container;
  classifying the selected inventory item to obtain a classification of the selected inventory item based at least in part on the item information about the selected inventory item;
  routing the selected inventory item based at least in part on the classification of the selected inventory item such that:
    the selected inventory item is routed for manual handling if the classification of the selected inventory item indicates that the selected inventory item is designated for an operation to be performed relative to the selected inventory item by a human operator; or
    the selected inventory item is routed for automated handling if the classification of the selected inventory item indicates that the selected inventory item is designated for an operation to be performed relative to the selected inventory item by a robotic manipulator.

14. The method of claim 13, further comprising:
  instructing a mobile drive unit to move a rack carrying the selected inventory item based at least in part on how the selected inventory item is routed.

15. The method of claim 13, wherein routing the selected inventory item comprises routing a container carrying the selected inventory item.

16. The method of claim 13, wherein the classification is based at least in part on an assessment of whether the robotic manipulator is capable of satisfying parameters for performing an operation of removing the selected inventory item from a container carrying the selected inventory item.

17. The method of claim 13, further comprising determining instructions for storage of the selected inventory item based at least in part on the classification.

18. The method of claim 13, further comprising determining instructions for retrieval from storage of the selected inventory item based at least in part on the classification.

19. The method of claim 13, further comprising, based at least in part on the classification, determining instructions for removal of the selected item from a container that contains the selected item and has been routed to bypass storage in response to the selected item corresponding to an ordered item.

20. The method of claim 13, further comprising, based at least in part on the classification, determining instructions for removal of the selected item for order consolidation in response to the selected item corresponding to an ordered item.

* * * * *